United States Patent
Boivie

(10) Patent No.: US 9,864,853 B2
(45) Date of Patent: Jan. 9, 2018

(54) ENHANCED SECURITY MECHANISM FOR AUTHENTICATION OF USERS OF A SYSTEM

(71) Applicant: International Business Machines Corporation, Armonk, NY (US)

(72) Inventor: Richard Harold Boivie, Monroe, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/954,977

(22) Filed: Nov. 30, 2015

(65) Prior Publication Data
US 2016/0140329 A1 May 19, 2016

Related U.S. Application Data

(63) Continuation-in-part of application No. 13/033,367, filed on Feb. 23, 2011, now Pat. No. 8,578,175.

(51) Int. Cl.
*G06F 21/31* (2013.01)
*G06F 21/62* (2013.01)
(Continued)

(52) U.S. Cl.
CPC ............ *G06F 21/31* (2013.01); *G06F 21/32* (2013.01); *G06F 21/57* (2013.01); *G06F 21/602* (2013.01);
(Continued)

(58) Field of Classification Search
CPC ...... G06F 21/31; G06F 21/32; G06F 21/6218; G06F 21/602
(Continued)

(56) References Cited

U.S. PATENT DOCUMENTS

| 4,573,119 A | 2/1986 | Westheimer |
| 4,926,481 A * | 5/1990 | Collins, Jr. ............. G06F 21/46 380/45 |

(Continued)

FOREIGN PATENT DOCUMENTS

| CN | 1309351 A | 8/2001 |
| JP | H 07287514 A | 10/1995 |

(Continued)

OTHER PUBLICATIONS

Jiang, "On Information System Security Architecture", 2004, Journal of Systems Science and Information, vol. 2, pp. 637-645.*

(Continued)

*Primary Examiner* — Morshed Mehed
*Assistant Examiner* — Gregory Lane
(74) *Attorney, Agent, or Firm* — Jeff S. LaBaw, Esq.; McGinn IP Law Group, PLLC

(57) ABSTRACT

A method and structure for authenticating users of a system that prevents theft of passwords and re-use of passwords. The method and structure use one-time passwords and a Secure CPU technology that cryptographically protects a software module known as a Secure Object from other software on a system. The method and structure generate and validate one-time passwords within Secure Objects and use a communications mechanism to securely communicate passwords or information used to generate passwords that makes use of cryptography and the protected and unprotected regions of a Secure Object to provide strong end-to-end security.

19 Claims, 5 Drawing Sheets

(51) Int. Cl.
*G06F 21/32* (2013.01)
*G06F 21/60* (2013.01)
*G06F 21/57* (2013.01)
*G06F 21/74* (2013.01)

(52) U.S. Cl.
CPC .......... *G06F 21/6218* (2013.01); *G06F 21/74* (2013.01); *G06F 2221/034* (2013.01)

(58) Field of Classification Search
USPC ................................................. 713/184, 189
See application file for complete search history.

(56) References Cited

U.S. PATENT DOCUMENTS

| | | |
|---|---|---|
| 5,222,139 A | 6/1993 | Takaragi et al. |
| 5,481,613 A | 1/1996 | Ford et al. |
| 5,748,782 A | 5/1998 | Ferreira et al. |
| 5,845,281 A | 12/1998 | Benson et al. |
| 6,185,685 B1 | 2/2001 | Morgan et al. |
| 6,397,331 B1 | 5/2002 | Ober et al. |
| 6,704,871 B1 | 3/2004 | Kaplan et al. |
| 6,708,273 B1 | 3/2004 | Ober et al. |
| 6,751,709 B2 | 6/2004 | Seidl et al. |
| 6,807,577 B1* | 10/2004 | Gillespie ............. H04L 63/0823 709/203 |
| 6,968,420 B1 | 11/2005 | Giles et al. |
| 7,055,040 B2 | 5/2006 | Klemba et al. |
| 7,136,488 B2 | 11/2006 | Hashimoto et al. |
| 7,167,956 B1 | 1/2007 | Wright et al. |
| 7,249,225 B1 | 7/2007 | Seidl et al. |
| 7,260,726 B1 | 8/2007 | Doe et al. |
| 7,290,288 B2 | 10/2007 | Gregg et al. |
| 7,483,930 B1 | 1/2009 | Wright et al. |
| 7,516,331 B2 | 4/2009 | Jin et al. |
| 7,747,877 B2 | 6/2010 | Jin et al. |
| 7,865,733 B2 | 1/2011 | Goto et al. |
| 7,933,413 B2 | 4/2011 | Steeves et al. |
| 8,041,947 B2 | 10/2011 | O'Brien et al. |
| 8,055,910 B2 | 11/2011 | Kocher et al. |
| 8,086,871 B2 | 12/2011 | McIntosh et al. |
| 8,108,641 B2 | 1/2012 | Goss et al. |
| 8,170,205 B2 | 5/2012 | Takeda |
| 8,381,288 B2 | 2/2013 | Sahita et al. |
| 8,392,725 B2 | 3/2013 | McIntosh et al. |
| 8,464,011 B2 | 6/2013 | Krig |
| 8,479,286 B2 | 7/2013 | Dalcher et al. |
| 8,572,400 B2 | 10/2013 | Lin et al. |
| 8,738,932 B2 | 5/2014 | Lee et al. |
| 8,782,435 B1 | 7/2014 | Ghose |
| 8,812,860 B1* | 8/2014 | Bray ....................... G06F 21/34 713/182 |
| 9,311,458 B2 | 4/2016 | Mangalampalli |
| 2001/0010722 A1 | 8/2001 | Enari |
| 2001/0014157 A1 | 8/2001 | Hashimoto et al. |
| 2001/0019614 A1 | 9/2001 | Madoukh |
| 2001/0050990 A1 | 12/2001 | Sudia |
| 2002/0064283 A1 | 5/2002 | Parenty |
| 2002/0101995 A1 | 8/2002 | Hashimoto |
| 2002/0166053 A1 | 11/2002 | Wilson |
| 2002/0172368 A1 | 11/2002 | Peterka |
| 2004/0003262 A1 | 1/2004 | England |
| 2004/0039926 A1 | 2/2004 | Lambert |
| 2004/0123112 A1 | 6/2004 | Himmel |
| 2004/0123127 A1 | 6/2004 | Teicher et al. |
| 2004/0123146 A1 | 6/2004 | Himmel |
| 2004/0139346 A1 | 7/2004 | Watt |
| 2005/0038998 A1 | 2/2005 | Ueno |
| 2005/0044390 A1 | 2/2005 | Trostle |
| 2005/0076226 A1 | 4/2005 | Boivie et al. |
| 2005/0108507 A1 | 5/2005 | Chheda |
| 2005/0108551 A1* | 5/2005 | Toomey .................. G06F 21/31 713/185 |
| 2005/0166069 A1 | 7/2005 | Hashimoto et al. |
| 2005/0177742 A1 | 8/2005 | Benson et al. |
| 2005/0235148 A1* | 10/2005 | Scheidt ................... G06F 21/31 713/168 |
| 2005/0257079 A1 | 11/2005 | Arcangeli |
| 2006/0041759 A1* | 2/2006 | Kaliski, Jr. ............. G06F 21/31 713/184 |
| 2006/0106801 A1 | 5/2006 | Cox et al. |
| 2006/0156418 A1 | 7/2006 | Polozoff |
| 2006/0242611 A1 | 10/2006 | Drake |
| 2007/0006294 A1 | 1/2007 | Hunter |
| 2007/0033642 A1* | 2/2007 | Ganesan .............. H04L 63/0428 726/10 |
| 2007/0130463 A1* | 6/2007 | Law ........................ G06F 21/34 713/168 |
| 2007/0101124 A1 | 7/2007 | Pitts |
| 2008/0046762 A1 | 2/2008 | Kershaw |
| 2008/0072068 A1 | 3/2008 | Wang et al. |
| 2008/0109903 A1 | 5/2008 | Werner et al. |
| 2008/0133935 A1* | 6/2008 | Elovici ............... G06F 21/6227 713/193 |
| 2008/0155273 A1 | 6/2008 | Conti |
| 2008/0205651 A1 | 8/2008 | Goto et al. |
| 2008/0270806 A1 | 10/2008 | Nakamura |
| 2008/0288786 A1 | 11/2008 | Fiske |
| 2008/0301441 A1 | 12/2008 | Calman et al. |
| 2008/0319782 A1 | 12/2008 | Good |
| 2009/0006796 A1 | 1/2009 | Chang et al. |
| 2009/0006864 A1 | 1/2009 | Hashimoto et al. |
| 2009/0113136 A1 | 4/2009 | Aharonov |
| 2009/0217385 A1 | 8/2009 | Teow |
| 2009/0240717 A1 | 9/2009 | Mimatsu |
| 2009/0249492 A1* | 10/2009 | Boesgaard Sorensen ............ G06F 21/556 726/27 |
| 2009/0259857 A1 | 10/2009 | Gehrmann |
| 2009/0300139 A1 | 12/2009 | Shoemaker et al. |
| 2009/0300366 A1 | 12/2009 | Gueller et al. |
| 2010/0017604 A1 | 1/2010 | Husa |
| 2010/0017625 A1 | 1/2010 | Johnson |
| 2010/0031061 A1 | 2/2010 | Watanabe et al. |
| 2010/0119068 A1 | 5/2010 | Harris |
| 2010/0153746 A1 | 6/2010 | Takeuchi et al. |
| 2010/0161904 A1 | 6/2010 | Cypher et al. |
| 2010/0262824 A1 | 10/2010 | Keshavachar et al. |
| 2010/0263029 A1 | 10/2010 | Tohmo et al. |
| 2010/0281273 A1 | 11/2010 | Lee et al. |
| 2010/0318569 A1 | 12/2010 | Munday |
| 2011/0064217 A1 | 3/2011 | Fry et al. |
| 2011/0145899 A1 | 6/2011 | Cao et al. |
| 2011/0258462 A1 | 10/2011 | Robertson |

FOREIGN PATENT DOCUMENTS

| | | |
|---|---|---|
| JP | 2001-230770 A | 8/2001 |
| JP | 2001-318787 A | 11/2001 |
| JP | 2002-232417 A | 8/2002 |
| JP | 2006-018528 A | 1/2006 |
| JP | 2006-227777 A | 8/2006 |
| JP | 2006-309766 A | 11/2006 |
| JP | 2007-514994 A | 6/2007 |
| JP | 2007-233426 A | 9/2007 |
| JP | 2008-210225 A | 9/2008 |
| TV | V200841682 A | 10/2008 |
| TW | 200822068 A | 5/2008 |
| WO | WO 98/54633 A1 | 12/1998 |
| WO | WO 2005-096120 A1 | 10/2005 |
| WO | WO 2008/003833 A1 | 1/2008 |

OTHER PUBLICATIONS

Haifeng, et al. "Memory Confidentiality and Integrity Protection Method Based on Variable Length Counter", 2012, IEEE, p. 290-294.
Frincke, "Developing Secure Objects"; Google, 1995-1996.
Somogyi, et al., "NbIDL: Secure, Object-Oriented, Client-Server Middleware", Google, 1998.
SAP Functions in Detail; "Crystal Reports Server—A Functional Overview", Google, 2008.

(56) References Cited

OTHER PUBLICATIONS

PCT Notification Concerning Transmittal of International Preliminary Report on Patentability dated Jan. 12, 2012 (PCT Application No. PCT/US2010/001811).
Henry Levy, Capability-Based Computer Systems, Published by Digital Press 1984. http://www.cs.washington.edu/homes/levy/capabook.
Theodore A. Linden, Operating System Structure to Support Security and Reliable Software, Institute for Computer Sciences and Technology, National Bureau of Standards, Washington, DC 20234 http://delivery.acm.org/10.1145/360000/356682/P409.linden.pdf—Abstract Only ACM Computing Survey (CSUR), vol. 8, Issue 4, Dec. 1976.
Canetti, et al., "A Two Layers Approach for Securing an Object Store Network", Proceedings of the First International IEEE Security in Storage Work-Shop (2002) (SISW'02), 1-14.
Wang, et al., "Keep Passwords Away from Memory: Password Caching and Verification Using TPM", $22^{nd}$ International Conference on Advanced Information Networking and Applications, IEEE, 755-762, DOI: 10.1109/AINA, 2008.109.
Catrein, et al. "Private Domains in Networks of Information", IEEE International Conference Communications (ICC) Work-Shops, 2009.1-5.
PCT Notification of Transmittal of the International Search Report and the Written Opinion of the International Searching Authority, or the Declaration dated Oct. 1, 2010.
Williams, et al., "CPU Support for Secure Executables", The $4^{th}$ International Conference on Trust and Trustworthy Computing, Jun. 22-24, 2011, Pittsburgh, PA.
Williams, et al., "CPU Support for Secure Executables" Stony Brook University, Power Point Presentation at the $4^{th}$ International Conference on Trust and Trustworthy Computing, Jun. 22-24, 2011, Pittsburgh, PA.
United States Office Action dated Aug. 14, 2013 in U.S. Appl. No. 13/226,079.
United States Office Action dated Aug. 14, 2013 in U.S. Appl. No. 12/492,738.
United States Office Action dated Oct. 8, 2014 in U.S. Appl. No. 13/226,079.
United States Notice of Allowance dated Jul. 7, 2014 in U.S. Appl. No. 13/033,455.
United States Notice of Allowance dated May 5, 2014 in U.S. Appl. No. 12/492,738.
Suh, et al., "Efficient Memory Integrity Verification and Encryption for Secure Processors", $36^{th}$ International Symposium on Microarchitecture, 2003 IEEE, pp. 1-12.
Yang, et al., "Fast Secure Processor for Inhibiting Software Piracy and Tampering", $36^{th}$ International Symposium to Microarchitecuture, 2003 IEEE, pp. 1-10.
United States Office Action dated 'Feb. 12, 2014 in U.S. Appl. No. 12/492,738.
United States Office Action dated Mar. 19, 2014 in U.S. Appl. No. 13/226,079.
United States Office Action dated Oct. 4, 2013 in U.S. Appl. No. 12/878,696.
United States Office Action dated Mar. 13, 2015 in U.S. Appl. No. 13/226,079.
Haifend, "Memory Confidentiality and Integrity Protection Method Based on Variable Length Counter", Dec. 1, 2014, Journal of Algorithms & Computational Technology, pp. 421-439.
United Sates Action dated Jun. 26, 2015, in U.S. Appl. No. 12/878,696.
European Search Report dated Mar. 4, 2016.
United States Office Action dated May 24, 2016, in U.S. Appl. No. 14/745,851.
United States Office Action dated Nov. 23, 2016, in U.S. Appl. No. 15/149,884.
United States Office Action dated Nov. 29, 2016, in U.S. Appl. No. 14/745,851.
United States Office Action dated Jul. 10, 2017, in U.S. Appl. No. 15/492,121.
United States Notice of Allowance dated Aug. 4, 2017, in U.S. Appl. No. 13/226,079.
Haris Lekatsas, et al., "Cypress: Compression and Encryption of Data and Code for Embedded Multimedia Systems", IEEE Design & Test of Computers, vol. 21, Issue 5, Publication Date: 2004. http://Ieeexplore.ieee.org/stamp/stamp.jps?arnumber=1341379.
Crispin Cowan, et al., "Buffer Overflows: Attacks and Defenses for the Vulnerability of the Decade" Foundations of Instrusion Tolerant Systems, Publication Date: 2003. http://eeexplore.ieee.org/stam/stamp.jsp?arnumber+1264935.
United States Notice of Allowance dated Sep. 13, 2017, in U.S. Appl. No. 15/246,277.

\* cited by examiner

ENHANCED SECURITY MECHANISM FOR AUTHENTICATION OF USERS OF A SYSTEM

The present application is related to the following patent applications all of which are incorporated herein by reference: U.S. patent application Ser. No. 12/492,738, filed on Jun. 26, 2009, to Richard H. Boivie, entitled "Support for Secure Objects in a Computer System", now issued as U.S. Pat. No. 8,819,446, U.S. patent application Ser. No. 12/878, 696, filed on Sep. 9, 2010, to Richard H. Boivie, entitled "Cache Structure for a Computer System Providing Support for Secure Objects", U.S. patent application Ser. No. 13/033, 367, filed on Feb. 23, 2011, to Boivie and Williams, entitled "Secure Object Having Protected Region, Integrity Tree and Unprotected Region", now issued as U.S. Pat. No. 8,578, 175, U.S. patent application Ser. No. 13/033,455, filed on Feb. 23, 2011, to Boivie and Williams, entitled "Building and Distributing Secure Object Software", now issued as U.S. Pat. No. 8,954,752, U.S. patent application Ser. No. 13/226,079, filed on Sep. 6, 2011, to Boivie and Pendarakis, entitled "Protecting Application Programs from Malicious Software or Malware", and U.S. patent application Ser. No. 14/839,691, filed on Aug. 28, 2015, to Boivie et al, entitled "System and Method for Supporting Secure Objects Using a Memory Access Control Monitor".

BACKGROUND OF THE INVENTION

Field of the Invention

The present invention generally relates to securely generating, storing, using, and distributing user passwords. More specifically, a secure CPU (Central Processing Unit) architecture provides a mechanism whereby a password can be securely generated and used in a protected CPU environment and cryptographically protected whenever it is outside the protected CPU environment, including during transit and during storage in a memory or other storage device.

Description of the Related Art

Since the 1970's, computer scientists have recognized the importance of providing strong cryptographic protection for the passwords that are used to access a computer system. In a paper published in the Communications of the ACM in 1979, for example, Robert Morris and Ken Thompson describe how Unix systems use encrypted passwords and never store passwords "in the clear". This approach has been used since the mid-1970's to provide strong protection for the passwords used on Unix-based systems.

But "in the clear" passwords can still be stolen by various means, e.g., by keystroke-loggers or "memory scraping" malware that an adversary manages to install on a user's personal computer, or by other means such as a phishing or spear-phishing attack in which a user is tricked into entering his credentials into a system controlled by an adversary.

One way of dealing with the problem of stolen passwords is to use a one-time password system. In a one-time password system, a password is valid for only a single login session and a different password is required for each subsequent login. Thus, if an adversary manages to capture the password that a user uses to login to a system, the adversary will still not be able to gain access to the system by re-using the password.

But a one-time password system introduces an additional security challenge since users and the systems they access require a continuous stream of one-time passwords and this stream of passwords and the information used to generate this stream of passwords must be protected.

SUMMARY OF THE INVENTION

In view of the foregoing, and other, exemplary problems, drawbacks, and disadvantages of the conventional systems, it is an exemplary feature of the present invention to provide a structure (and method) in which passwords are securely generated, stored, used, and distributed using a secure CPU environment.

It is, therefore, an exemplary feature of the present invention to provide a structure and method for protecting a sequence of one-time passwords as well as the information that is used to generate the sequence by encapsulating this information inside a 'Secure Object' that is protected by a Secure CPU technology such as the Secure CPU technology described in the patent applications incorporated by reference.

The information in such a Secure Object is protected from all the other software on a system including 'privileged software', such as an operating system and applications that run with root privilege, as well as malware that obtains root privilege by exploiting a vulnerability in privileged software. Since the information in a Secure Object is protected from 'other software', and since the information that is sent from one Secure Object to another can be cryptographically protected from other software in a way that provides end-to-end protection without any point of vulnerability along the way, an adversary is not able to obtain a password that can be used to gain unauthorized access to a system.

In a first aspect of the present invention, to achieve the above features and objects, described herein is a method for securely generating, storing, using and distributing user passwords.

In a second aspect of the present invention, to achieve the above features and objects, described herein is a structure for securely generating, storing, using and distributing user passwords.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF EXEMPLARY EMBODIMENTS OF THE INVENTION

Figure 2:
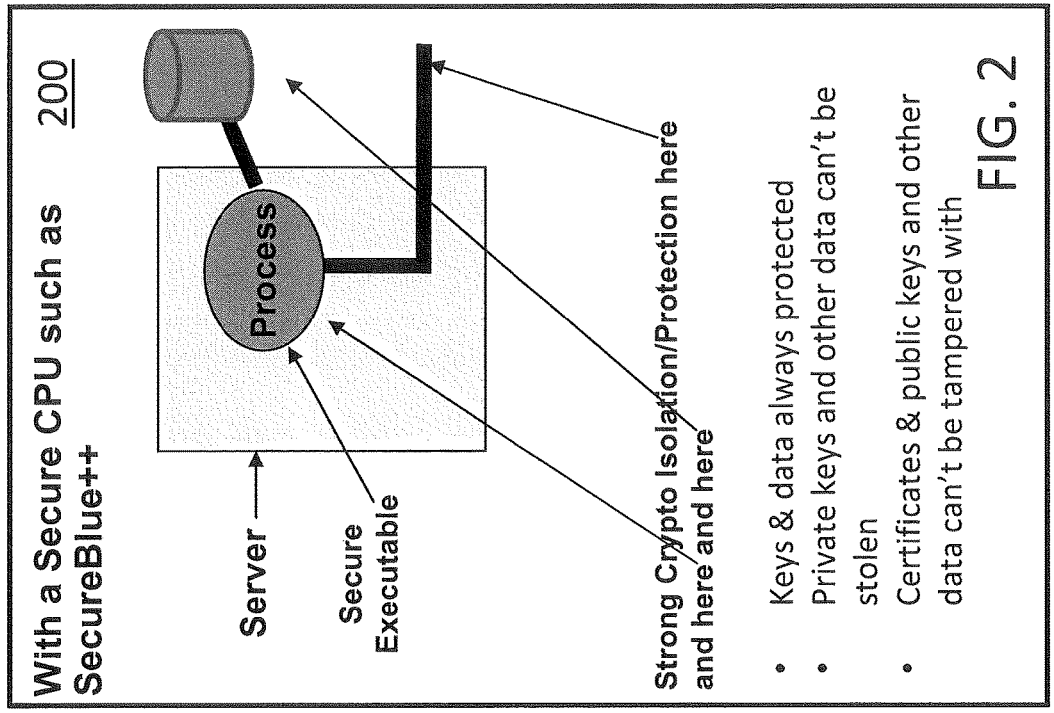
FIG. 2 shows an exemplary computer system that includes a Secure CPU that cryptographically protects the information in an application on the system from all the other software on the system, which can be used to securely generate, store, distribute and process one-time passwords.

Referring now to the figures, and more particularly to FIGS. 1-6, exemplary embodiments of the method and structures according to the present invention will now be described.

As discussed, the security of passwords is important, and the security of passwords in a 'single sign-on' system is particularly important. Single sign-on is a mechanism for providing access to a set of related but independent systems that does not require a user to sign-in at each of the individual systems. Since a single sign-on can provide access to a large number of systems and a large number of resources, strong protection of a single sign-on system's passwords is essential.

As mentioned, a one-time password system can be used to prevent the unauthorized re-use of a password that an adversary may be able to obtain by a keystroke logger, by "memory-scraping" malware or by some other means.

But, as discussed above, a one-time password system introduces an additional security challenge since users and the systems they access require a stream of one-time passwords and this stream of passwords and the information used to generate this stream must be secure.

One way to protect this information is to generate and process these one-time passwords in a Secure Object that is protected by a Secure CPU technology like the Secure CPU technologies described in the patent applications incorporated by reference.

The Secure CPU technology protects the confidentiality and integrity of information in a Secure Object from physical attack (i.e., physical probing and physical tampering) and it also protects this information from the other software on a system including 'privileged software' such as an operating system and applications that run with root privilege—and from malware that obtains root privilege by exploiting a vulnerability in privileged software and "infecting" the privileged software.

A Secure Object that is protected by a Secure CPU like the CPUs described in the patent applications incorporated by reference is cryptographically protected from the other software on a system. When a Secure Object's information is outside the Secure CPU (e.g., when the Secure Object is in the file system prior to execution and when it is in memory or in the paging system during execution) it is encrypted under keys that are not available to any other software, and an integrity tree is used to detect tampering. When a Secure Object's information is inside the CPU (e.g., in on-chip caches), it is in the clear but ownership labels prevent other software from accessing or undetectably tampering with that information.

Since a Secure Object's information is encrypted whenever it is outside the CPU and since other software cannot access the Secure Object's unencrypted information inside the CPU, other software cannot access a Secure Object's information or tamper with it without detection.

The Secure CPU protects both the confidentiality and the integrity of a Secure Object's code and data. It can protect the confidentiality of passwords and other secret information including session keys that a Secure Object may use for secure communications and private keys or other information that a Secure Object may use to prove its identity. The Secure CPU can also protect the integrity of a Secure Object's algorithms as well as the integrity of any public keys or digital certificates that a Secure Object may use to authenticate the identities of other entities in a network.

As discussed above, a Secure Object is cryptographically protected from the other software on a system including the operating system. The operating system cannot access the unencrypted form of a Secure Object's information and it cannot undetectably tamper with that information. But a Secure Object can make use of operating system services without trusting the operating system with any sensitive information.

In the paging system, for example, the operating system moves an application's pages between disk and memory but the pages are encrypted and the operating system has no access to the encryption keys.

A Secure Object can also use the operating system for network I/O without trusting the operating system. For network I/O, a Secure Object uses buffers in an unprotected portion of its address space. Since the buffers in this region are not protected by the Secure CPU technology, the operating system and a remote system will be able to "see" the same information that the Secure Object "sees".

Since the CPU decrypts information that moves from a cryptographically protected region into the CPU and since the CPU does not encrypt information that moves from the CPU to an unprotected region, the act of copying information from the protected region to the unprotected region has the effect of removing the Secure Object crypto protection. The operating system can send information in this region to a remote system and the remote system will be able to read it. Similarly the act of copying information from an unprotected region to a protected region has the effect of cryptographically protecting the information from other software. This is useful when information is received from a remote system.

Note that although the unprotected region is not protected by the Secure CPU technology, information in this region can still be cryptographically protected e.g. via standard communications security mechanisms such as SSL (Secure Sockets Layer), TLS (Transport Layer Security) or IPsec (Internet Protocol Security). If a message that is to be sent to a remote system is encrypted under TLS, say, before it is moved into the unprotected region, the message will be protected in the "unprotected" region by the same means that it is protected when it is traveling across a network. If, at the receiving end, the message is moved to the protected region before the TLS decryption, the message will be protected from one Secure Object to another with no point of vulnerability along the way.

Note too that the encryption keys that a Secure Object uses for TLS or other communications security mechanism will be protected by the Secure Object protection so other software including the operating system will not be able to access the keys or any packets protected by those keys. And the operating system will not be able to undetectably tamper with the keys or the packets. And since private keys and other data in a Secure Object cannot be stolen and since public keys and digital certificates in a Secure Object cannot be tampered with, a Secure Object can confirm with a high-level of confidence, the identity of an entity that is at the other end of a TLS connection for example.

Keys in a Secure Object can also be used to protect information that is stored on a disk or other storage medium and other software will not be able to access those keys or the information protected by those keys.

Figure 1:
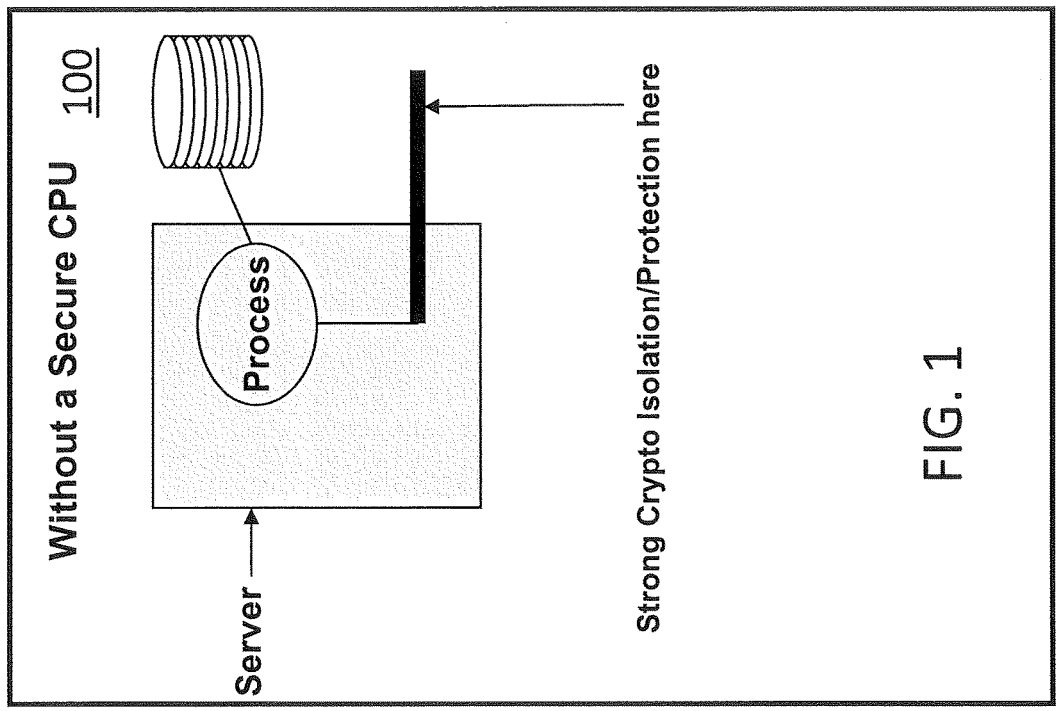
FIG. 1 shows a conventional computer system, which may provide strong cryptographic protection/isolation for an application's information that is sent across a network, but does not cryptographically protect the application's information from the other software on the server.

FIG. 1 illustrates a conventional server 100 that does not include a Secure CPU. FIG. 2 illustrates a server that uses a Secure CPU that provides support for Secure Objects that are each protected from all the other software on a system.

As illustrated in FIG. 1, information that is sent to or received from another system can be cryptographically protected so that the confidentiality and integrity of that information is protected on the way from one system to another. But the confidentiality and integrity of information inside the system in memory or on disk is not protected from the other software in the system and is thus vulnerable to various forms of attack.

The server in FIG. 2, by contrast, uses a Secure CPU that protects the confidentiality and integrity of information in a Secure Object. And this allows a Secure Object to also protect the confidentiality and integrity of information that it generates, that it processes, that it stores on disk and that it sends to another system as discussed above.

Since 'other software' cannot access or tamper with information in a Secure Object, a Secure Object can be used to generate passwords, or a sequence of one-time passwords that are protected from other software. A Secure Object can generate passwords based on a "seed" and a software pseudo random number generator for example; and the "seed" can either be "built into" the Secure Object or obtained from a hardware random number generator, say. Since 'other software' cannot access or tamper with information inside the Secure Object, the Secure Object can generate passwords that are secure.

A Secure Object can also be used to validate passwords that are received from another entity and it can do that securely. As discussed above, a Secure Object can securely receive information from another Secure Object with no point of vulnerability along the way and when a password is received from another entity it can be authenticated inside the Secure Object in an environment that is safe from tampering and where confidentiality is protected.

Passwords in a Secure Object can also be stored securely. When a Secure Object stores a password in memory, it is protected from other software by the Secure Object mechanisms discussed above. And a Secure Object can securely store information on a disk or other storage system as discussed above.

Since Secure Objects can send and receive information securely, passwords or information used to generate passwords can be securely sent to a device, such as a security token or a smart phone that an individual might use to obtain the next password that is needed to gain access to a system.

In summary, the Secure CPU and Secure Object technologies can be combined with a communications security mechanism that uses a communications protocol such as SSL or TLS and the protected and unprotected portions of a Secure Object's address space to provide strong end-to-end security, and these can be combined with methods of generating, distributing, storing, and processing one-time passwords to provide a strongly secure means of authenticating users of a computer system. This provides strong protection for the confidentiality and integrity of passwords and for the information that is used to generate a sequence of passwords, and it can protect this information from 'other software' as well as from physical attack both on client devices such as security tokens, smart phones, and tablet computers, and on servers. This strong protection is particularly important on servers since a server may store password information for many hundreds or many thousands of users.

Secure Objects can also be used to securely store, distribute, and process other kinds of authentication information including biometric information like fingerprints or the patterns on one's iris or retina for example. Of course, a secure one-time password scheme has one advantage in that, if information is compromised, it is a bit easier to change one's password, particularly if it's a one-time password, than it is to change one's fingerprints, iris, or retina.

Figure 3:
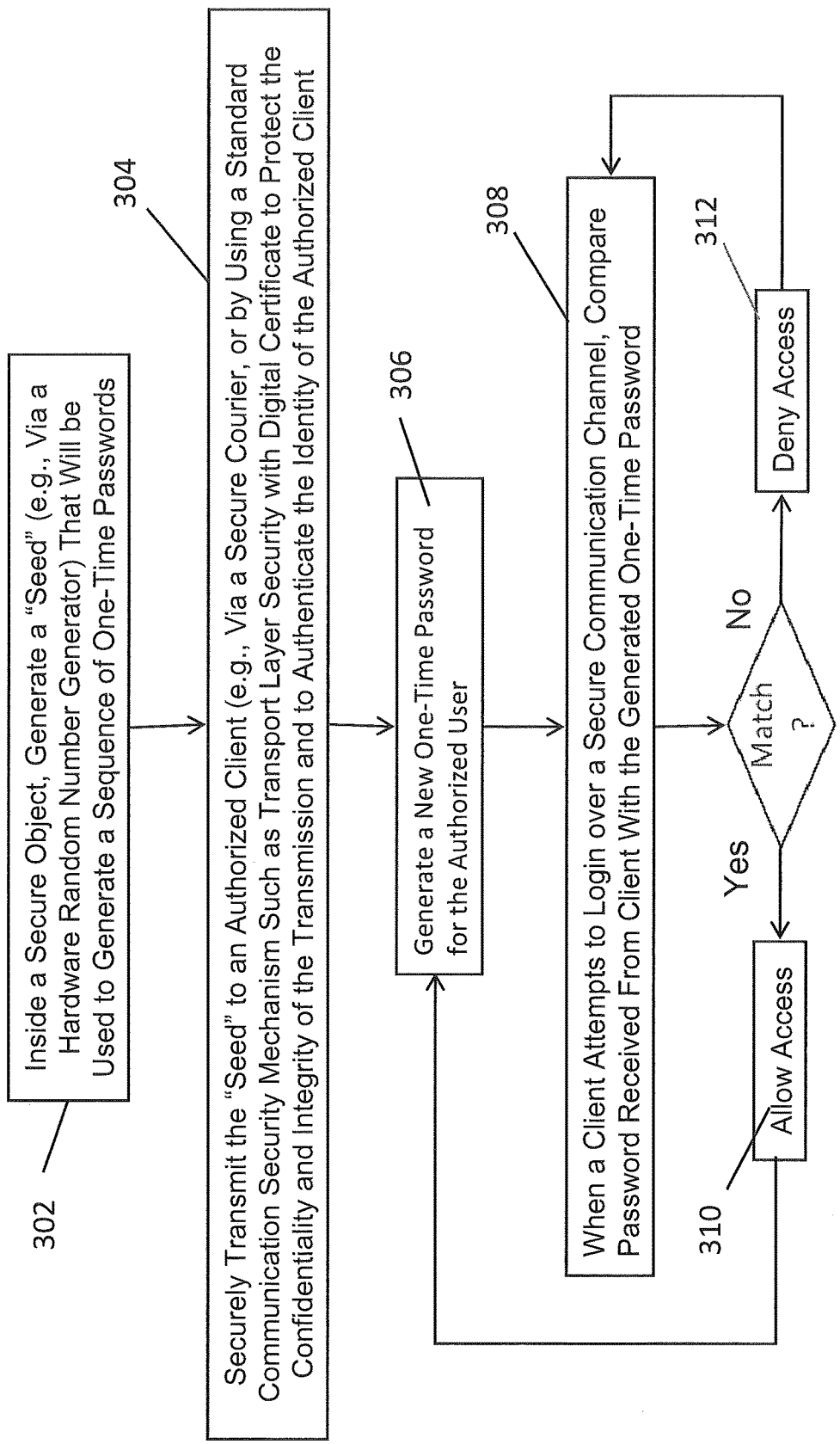
FIG. 3 shows exemplarily in flowchart format 300 an exemplary method of the present invention for securely generating, storing, using and distributing one-time passwords.

FIG. 3 shows in flowchart format 300 an exemplary embodiment of the present invention, as might be implemented in an Access Control Manager that runs on a server or on a cloud computing service and controls access to a system or resource. In this exemplary embodiment, the the Access Control Manager is implemented in a Secure Object that is protected from other software and the communications between this Secure Object and other entities is protected end-to-end as discussed above.

In step 302, the Access Control Manager generates a "seed value" that will be used in generating a sequence of one-time passwords for a given user. Note that there will be one such "seed value" for each authorized (i.e. each registered) user of a system.

In step 304, the "seed value" is securely sent to an authorized user e.g. via a secure courier or via a computer-based secure communications mechanism. As discussed previously, information can be securely sent from one Secure Object to another with no point of vulnerability along the way.

Once the seed value has been securely sent to a client, the Access Control Manager and the client can generate the same sequence of one time passwords.

In step 306, when a user attempts to login, the Access Control Manager will generate the next one-time password for that user.

In step 308, the Access Control Manager will compare the password it generated with the password received from the user. (To minimize the possibility of an adversary capturing the user's password, the user's password should be sent over a secure communications channel such as a TLS connection between two Secure Objects.)

If the passwords match, access is allowed in block 310 and the next time the user logs in, he will need the next one-time password in the sequence as indicated in block 306. If the passwords do not match, access is denied in block 312. In this case, either an unauthorized user has attempted to login or an authorized user has entered an incorrect password so the Access Control Manager returns to step 308 so the current one-time password will be used the next time the user attempts to log in.

In the embodiment discussed above, the Access Control Manager and the client generate an identical sequence of passwords. For example, a user might have a smart phone with an app that generates the same sequence of passwords as the Access Control Manager once the appropriate seed value for that user has been provided. In another embodiment, the Access Control Manager might use a secure communications mechanism to provide the next password in the sequence to a user's smartphone or other device so that the user can enter that password on a laptop computer, say, to gain access to a system from the laptop computer. Other possibilities exist for securely conveying either the seed value or an actual password to an authorized user, and the present invention should not be considered as limited to these possible mechanisms. Note too that although, the above embodiments have discussed authentication of users of a computer system, the concepts discussed above could also be applied in other applications, e.g. in controlling access to a secure facility, for example.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
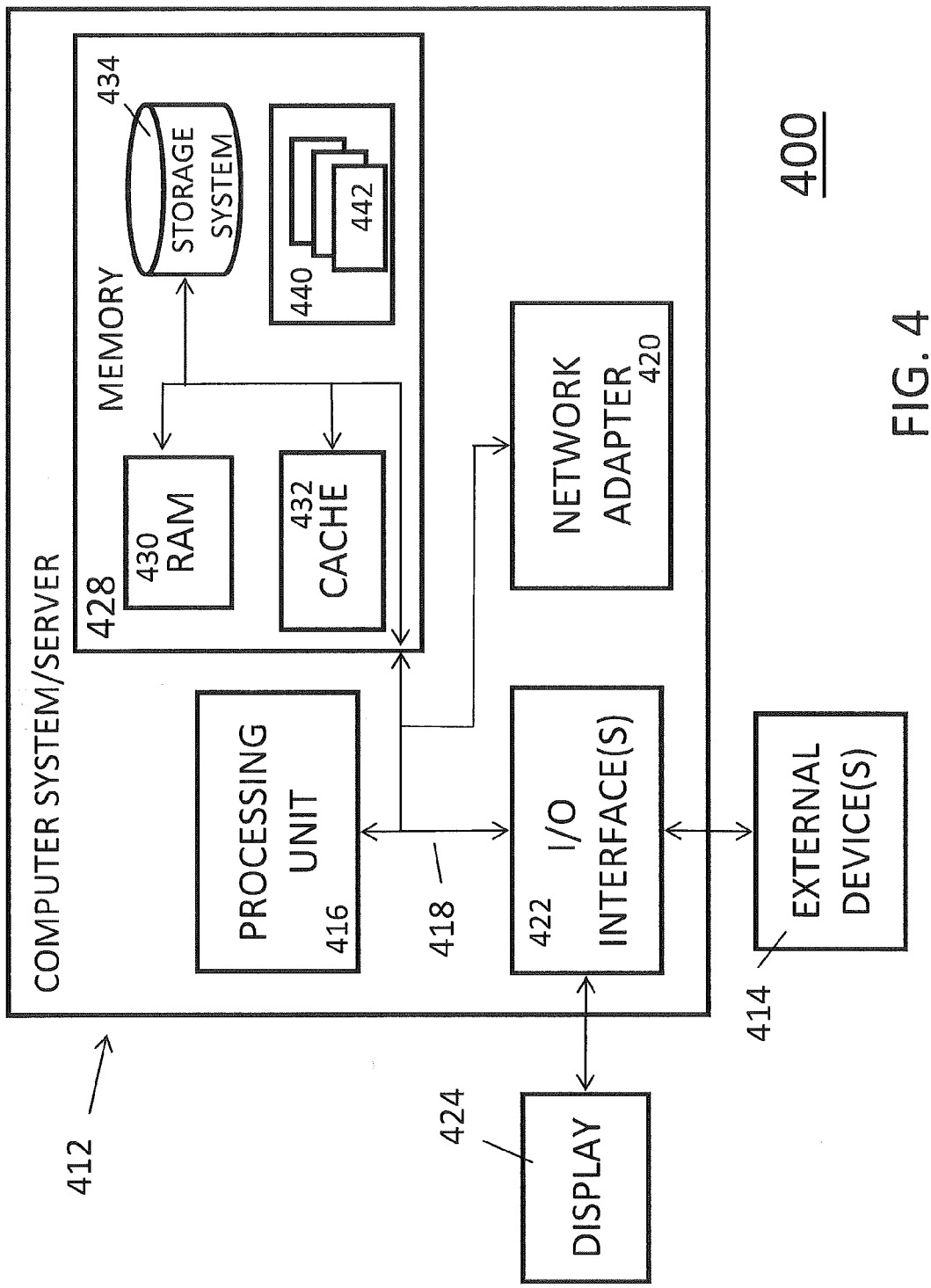
FIG. 4 depicts a cloud computing node 400 according to an exemplary embodiment of the present invention.

Referring now to FIG. 4, a schematic 400 of an example of a cloud computing node is shown. Cloud computing node 400 is only one example of a suitable cloud computing node and is not intended to suggest any limitation as to the scope of use or functionality of embodiments of the invention described herein. Regardless, cloud computing node 400 is capable of being implemented and/or performing any of the functionality set forth hereinabove.

In cloud computing node 400 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 400 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
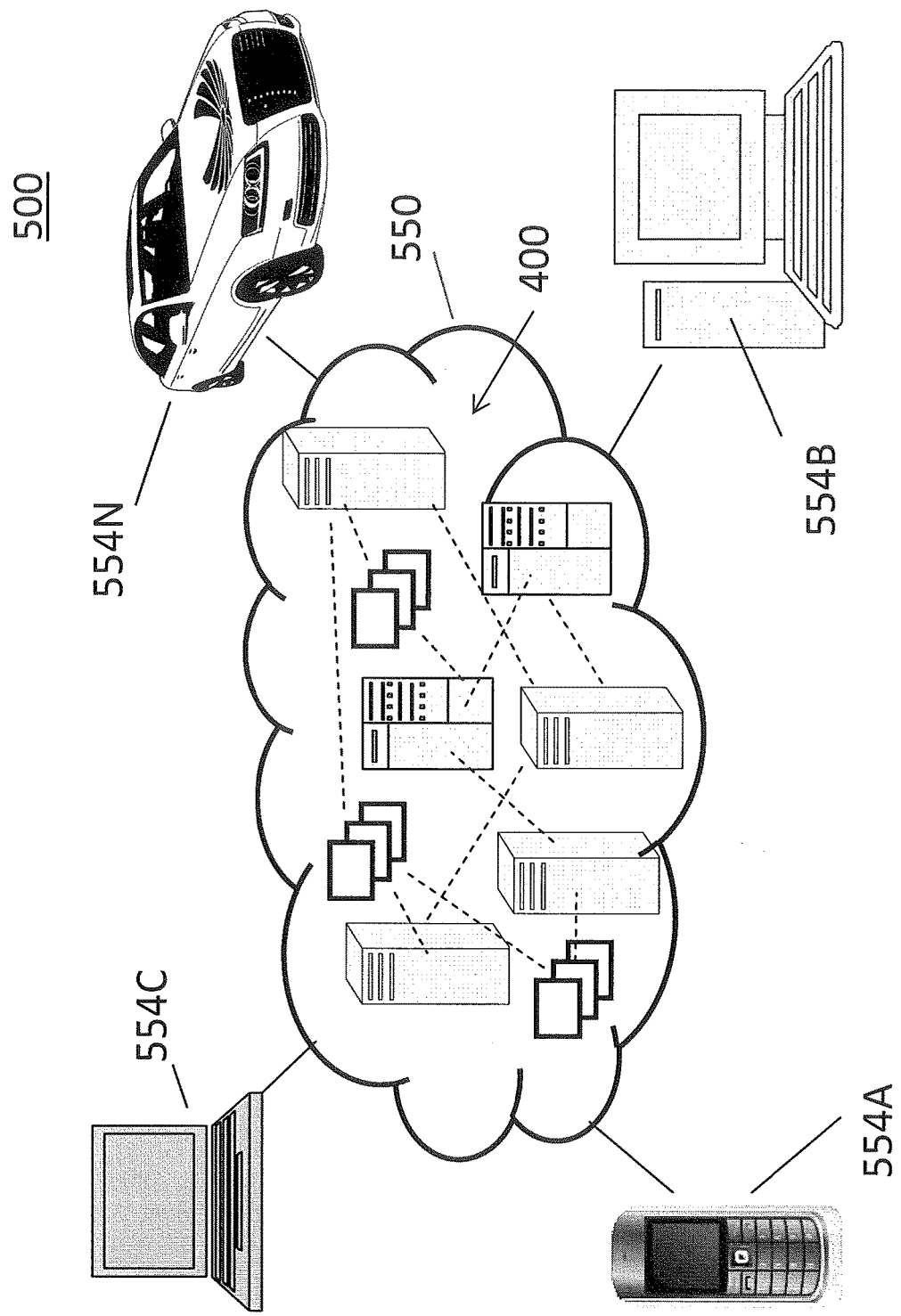
FIG. 5 depicts a cloud computing environment 500 according to an exemplary embodiment of the present invention.

Referring now to FIG. 5, an illustrative cloud computing environment 550 is depicted. As shown, cloud computing environment 550 comprises one or more cloud computing nodes 400 with which local computing devices used by cloud consumers, such as, for example, personal digital assistant (PDA) or cellular telephone 554A, desktop computer 554B, laptop computer 554C, and/or automobile computer system 554N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 400 and cloud computing environment 550 can communicate with any type of computerized device over any type of network and/or network addressable connection (e.g., using a web browser).

Figure 6:
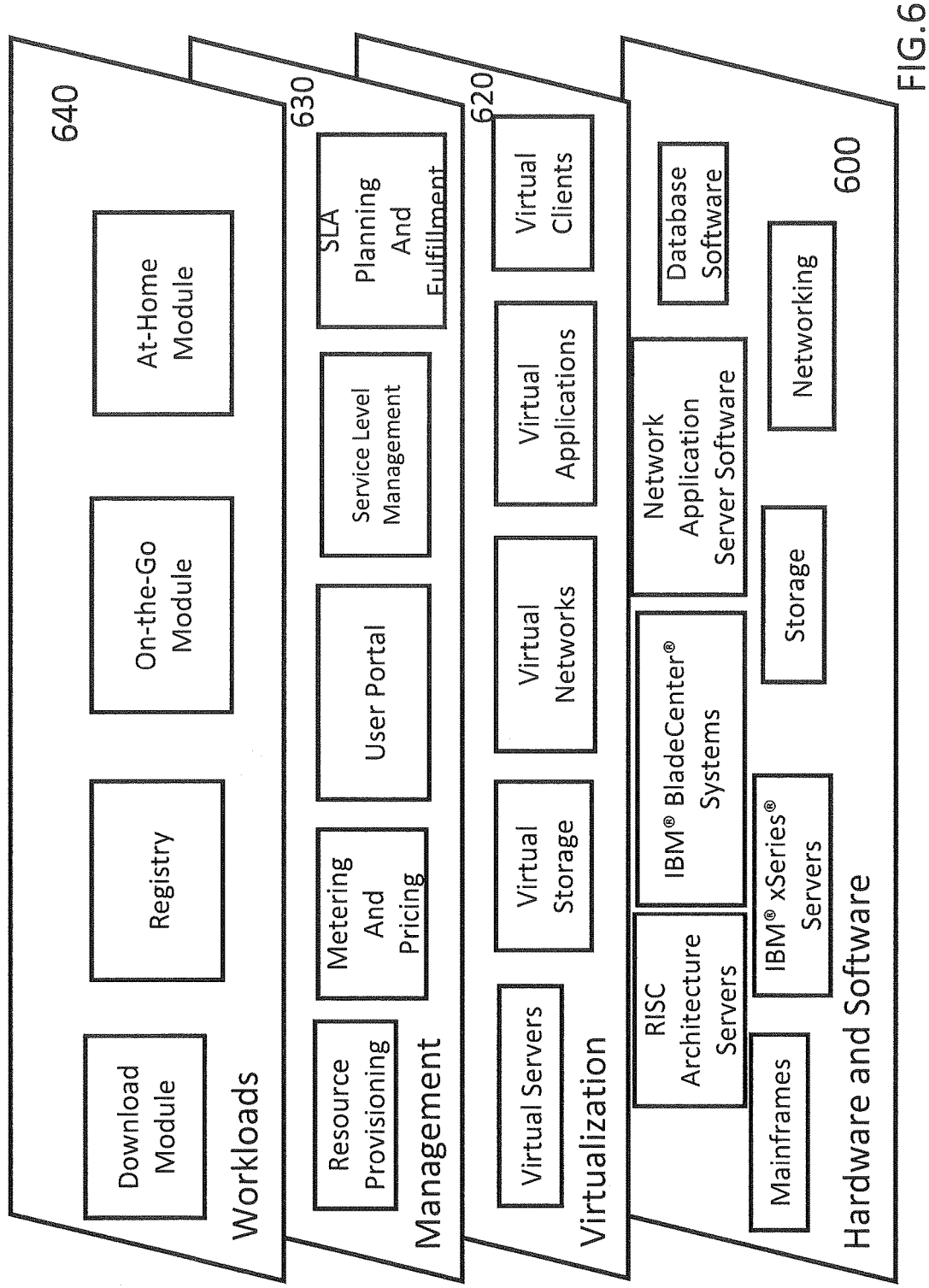
FIG. 6 depicts abstraction model layers 600-640 according to an exemplary embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 600.

Virtualization layer 620 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 620.

In one example, management layer 630 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment module provides pre-arrangement for, and procurement of, cloud computing resources for which a future requirement is anticipated in accordance with an SLA.

Workloads layer 640 provides examples of functionality for which the cloud computing environment may be utilized. Examples of workloads and functions which may be provided from this layer might include any number of functions and applications not even related to the present invention, such as mapping and navigation; software development and lifecycle management; virtual classroom education delivery; data analytics processing; transaction processing; and, more particularly relative to the present invention, such modules as a random number generator.

Although the present specification describes a means for providing secure user authentication based on one-time passwords and the Secure Object technology disclosed in the patent applications incorporated by reference, one having ordinary skill in the art will recognize that this is just one specific exemplary embodiment. It will be clear to one skilled in the art that other CPU architectures that can protect an application from the other software on a system could also be used.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method to control access to a resource, said method comprising:
on a computer system that provides support for Secure Objects, wherein each Secure Object comprises code and data that is protected from other software on the computer system, executing a Secure Object that includes therein authentication information that is used to authenticate one or more individuals that are allowed access to the resource,
wherein the Secure Object being executed by the computer system:
receives, from an individual that is attempting access to the resource, authentication information that is provided by the individual;
compares the authentication information received from the individual with authentication information within the Secure Object;
allows access to the resource if the authentication information provided by the individual matches authentication information in the Secure Object,
wherein said Secure Object uses a communication security mechanism inside the Secure Object to protect information that is one of sent to or received from the Secure Object, and
wherein said authentication information used to authenticate comprises at least one of a password and biometric information.

2. The method of claim 1, wherein the Secure Object is cryptographically protected from the other software on the computer system.

3. The method of claim 1, wherein said Secure Object comprises a Secure Object that is encrypted when outside a CPU (Central Processing Unit) of said computer system and information from said Secure Object being decrypted as retrieved from an external memory of said computer into said CPU.

4. The method of claim 1 in which the Secure Object securely transmits at least one of a password and information that is used to generate a password to another system.

5. The method of claim 4 in which the at least one of a one-time password and information for said one-time passwords is cryptographically protected from other software at all times on said system.

6. A system that controls access to a resource, said system comprising:
a Central Processing Unit (CPU) that provides support for Secure Objects, each Secure Object comprising information that is protected from other software on the system; and
a Secure Object being executed on the computer system, the Secure Object including therein authentication information that is used to authenticate one or more individuals that are allowed access to the resource, wherein the Secure Object being executed on the computer system:
receives from an individual that is attempting access to the resource, authentication information provided by the individual;
compares the authentication information received from the individual with authentication information within the Secure Object; and
allows access to the resource if the authentication information provided by the individual matches authentication information in the Secure Object, wherein said Secure Object uses a communication security mechanism inside the Secure Object to protect information that is one of sent to or received from the Secure Object and
wherein said authentication information used to authenticate comprises at least one of a password and biometric information.

7. The system of claim 6 that generates a sequence of secure one-time passwords that are protected from the other software on the system.

8. A cloud computing system that controls access to a resource, the cloud computing service comprising:
a Central Processing Unit (CPU) that provides support for Secure Objects, each Secure Object including information that is protected from other software on the system; and
a Secure Object being executed by the computer system that includes, in its protected information, authentication information that is used to authenticate one or more individuals that are allowed access to the resource;
wherein the Secure Object being executed:
receives from an individual that is attempting access to the resource, authentication information provided by the individual;

compares the authentication information received from the individual with authentication information within the Secure Object; and allows access to the resource if the authentication information provided by the individual matches authentication information in the Secure Object, wherein said Secure Object uses a communication security mechanism inside the Secure Object to protect information that is one of sent to or received from the Secure Object, and wherein said authentication information used to authenticate comprises at least one of a password and biometric information.

9. The method of claim 1, as implemented in a cloud service.

10. The system of claim 6, as implemented in a cloud service.

11. The method of claim 1, wherein said password comprises a one-time password.

12. The method of claim 1, wherein said computer system comprises a server connected to a network, further comprising invoking a communication security mechanism that provides security for transmission of a password between said server and a user, whether said password is being transmitted as a new password to said user or as a password from a user presented for authentication.

13. The method of claim 12, wherein said communication security mechanism comprises a communication protocol.

14. The method of claim 13, wherein said communication protocol comprises one of Secure Sockets Layer (SSL) and Transport Layer Security (TLS).

15. The method of claim 11, further comprising generating information for one-time passwords, as follows:

generating a seed value for a sequence of one-time passwords for an authorized client; and providing said seed value into an algorithm that generates a sequence of passwords for said authorized client from said input seed value.

16. The method of claim 15, further comprising:

receiving a password from a user when a user attempts to gain access to a system or resource;

comparing said received password with an expected password from said sequence of passwords;

denying an access if said received password does not match said expected password; and granting access if said received password matches said expected password.

17. The method of claim 16, wherein:

if said access is denied, then retaining said expected password for said user to be used in a next attempt by said user to gain access to said system or resource, and if said access is granted, making a next password in said sequence of passwords to be the expected password for said user, to be used in a next attempt by said user to gain access to said system or resource.

18. The method of claim 15, wherein said authorized client comprises one of a plurality of authorized clients, said method further comprising generating a seed value for a sequence of one-time passwords for each said authorized client; and providing said value into an algorithm that generates a sequence of passwords for said authorized client from said input seed value.

19. The method of claim 15 in which the Secure Object securely generates a sequence of one-time passwords that can be used to gain access to a system or resource.

* * * * *